US011327509B2

(12) United States Patent
Hart

(10) Patent No.: US 11,327,509 B2
(45) Date of Patent: May 10, 2022

(54) FLOW RATE CONTROLLER

(71) Applicant: Neoperl GmbH, Mullheim (DE)

(72) Inventor: Keith Hart, Worcestershire (GB)

(73) Assignee: Neoperl GmbH, Müllheim (DE)

( * ) Notice: Subject to any disclaimer, the term of this patent is extended or adjusted under 35 U.S.C. 154(b) by 427 days.

(21) Appl. No.: 16/476,981

(22) PCT Filed: Mar. 13, 2018

(86) PCT No.: PCT/EP2018/056222
§ 371 (c)(1),
(2) Date: Jul. 10, 2019

(87) PCT Pub. No.: WO2018/167051
PCT Pub. Date: Sep. 20, 2018

(65) Prior Publication Data
US 2019/0391600 A1   Dec. 26, 2019

(30) Foreign Application Priority Data

Mar. 13, 2017 (DE) .......................... 202017101427.4

(51) Int. Cl.
*G05D 7/01*   (2006.01)
*G01F 5/00*   (2006.01)
(52) U.S. Cl.
CPC ............. *G05D 7/012* (2013.01); *G01F 5/005* (2013.01)
(58) Field of Classification Search
CPC ................................ G05D 7/012; G01F 5/005
See application file for complete search history.

(56) References Cited

U.S. PATENT DOCUMENTS

| 2,444,677 | A | | 7/1948 | Rosenblum | |
|---|---|---|---|---|---|
| 2,960,109 | A | | 11/1960 | Wilson | |
| 3,847,178 | A | | 11/1974 | Keppel | |
| 5,409,042 | A | * | 4/1995 | Kirchner | F16L 55/10 138/40 |
| 5,771,921 | A | * | 6/1998 | Johnson | F16K 21/18 137/491 |
| 6,390,122 | B1 | | 5/2002 | Zhang et al. | |
| 9,663,928 | B2 | * | 5/2017 | Stein | E03C 1/08 |
| D904,567 | S | * | 12/2020 | Bian | F16K 1/00 D23/233 |
| 11,054,844 | B2 | * | 7/2021 | Tempel | E03C 1/02 |
| 11,085,177 | B2 | * | 8/2021 | Schurle | B05B 12/002 |
| 2005/0082504 | A1 | * | 4/2005 | Sassone | G05D 7/012 251/129.15 |

(Continued)

FOREIGN PATENT DOCUMENTS

| DE | 29520069 | 3/1996 |
|---|---|---|
| DE | 60207296 | 7/2006 |

(Continued)

*Primary Examiner* — Manuel A Rivera Vargas
*Assistant Examiner* — Yaritza H Perez Bermudez
(74) *Attorney, Agent, or Firm* — Volpe Koenig

(57) ABSTRACT

Disclosed is a flow rate controller in which a clear width (6) of a control gap (4) between a main part (3) and a control element (2), which is deformable according to the pressure in order for the flow rate through the control gap (4) to be kept constant, can be adjusted as a result of the fact that at least one supporting element that adjusts the clear width (6) of the control gap (4) is designed to be movable relative to a main part (3).

21 Claims, 11 Drawing Sheets

(56) References Cited

U.S. PATENT DOCUMENTS

| | | | |
|---|---|---|---|
| 2007/0163713 A1* | 7/2007 | Kasai | H01L 21/67017 |
| | | | 156/345.3 |
| 2007/0169262 A1 | 7/2007 | McDonald | |
| 2013/0075496 A1* | 3/2013 | Hart | E03C 1/08 |
| | | | 239/428.5 |
| 2014/0014216 A1 | 1/2014 | Tsai et al. | |
| 2014/0137970 A1* | 5/2014 | Bosio | F16L 55/027 |
| | | | 138/40 |
| 2016/0010759 A1 | 1/2016 | Tempel | |
| 2019/0391601 A1* | 12/2019 | Hart | G05D 7/012 |
| 2020/0124200 A1* | 4/2020 | Tochihara | F01P 7/14 |
| 2020/0268947 A1* | 8/2020 | Erbey, II | A61M 1/80 |
| 2021/0165427 A1* | 6/2021 | Kim | G05D 7/0113 |

FOREIGN PATENT DOCUMENTS

| | | |
|---|---|---|
| FR | 2731088 | 8/1996 |
| WO | 03054436 | 7/2003 |
| WO | 2013008199 | 1/2013 |
| WO | 2015069114 | 5/2015 |

* cited by examiner

FLOW RATE CONTROLLER

BACKGROUND

The invention relates to a flow rate regulator having a disc-like, deformable regulating body which is arranged on the inflow side with respect to a main body such that a control gap is formed between the regulating body and the main body, wherein at least one drain opening, arranged downstream of the control gap, is formed in the main body, wherein a clear width of the control gap is defined, at least during operation, by at least one support element.

Such flow regulators are known and are used in order to set a constant flow rate over a large pressure range.

In the process, the regulator body deforms in a pressure-dependent manner and closes the control gap such that a constant flow rate (usually always with regard to a unit of time) is set overall over a regulating range of the pressure.

It is conventional to produce a plurality of support elements together with the main body as an injection-moulding. The desired flow rate is in this case definable by the arrangement and dimensioning of the support elements. If the flow rate is intended to be set in a different manner for a flow rate regulator to be newly manufactured, the injection mould has to be changed.

SUMMARY

The invention is based on the object of it being possible to adapt an existing flow rate regulator design easily to customer requirements.

In order to achieve the object, a flow rate regulator with one or more of the features of the invention is provided. Thus, in particular, in the case of a flow rate regulator of the type described at the beginning, the invention provides, in order to achieve the object, that the at least one support element be arranged in a movable manner relative to the main body. Thus, the invention makes it possible to change the position of the support elements with regard to the main body after the flow rate regulator has been manufactured. This may be favourable, for example, in order to meet a new customer requirement with regard to a flow rate to be set, or in order for it to be possible to compensate for manufacturing tolerances. It is no longer necessary to change the injection moulds, and so it is possible to easily, inexpensively and quickly adapt the flow rate regulator to be manufactured.

In one configuration of the invention, provision may be made for the support element to be movable relative to the main body into a position in which the regulating body closes the drain opening. Thus, a flow rate regulator is able to be formed which realizes a stop and/or closure function. A flow rate of zero is thus settable in addition to the above-described setting possibilities.

Alternatively or additionally, provision may be made for the support element to be movable relative to the main body into a position in which the regulating body bears flat against the main body. Thus, a defined fit of the regulating body is achievable. It is particularly favourable for the regulating body to close the drain opening in the position in which it bears flat. Thus, a reliably closing closure function is achievable. Flat bearing can in this case be allowed by a correspondingly formed bearing region, for example a bearing region formed in a planar manner, on the main body.

In one configuration of the invention, provision may be made for the main body to be formed in a substantially planar manner on an inflow side delimiting the control gap. Thus, obstacle-free flow in the control gap is achievable on the other side of the at least one support element. This allows an even more precise definition of regulating behaviour by the support elements.

In one configuration of the invention, provision may be made for the regulating body to have an external contour of a circular disc. Thus, space conditions in a pipe accommodating the flow rate regulator are able to be exploited readily. Preferably, the control gap is open at the external contour, i.e. radially outwardly, such that water can flow in over a large opening cross section.

The regulating body may—for example in order to be fastened—have a central opening.

Such a central opening may serve in this or in an alternative configuration for the additional or exclusive inflow into the control gap. In this case, the regulating body can also be fastened, fitted and/or sealed at its external contour.

It is particularly favourable in this case for the at least one support element, in particular at least all the movable support elements, to be arranged around a circumference. Thus, it is possible to form a series of support elements in the circumferential direction. The support elements of the series may in this case be formed in a functionally and/or structurally similar or even identical manner. Individual descriptions or all descriptions of the at least one support element can therefore apply to selected or all support elements in advantageous configurations.

In one configuration of the invention, provision may be made for the regulating body to have a uniform thickness. Thus, the regulating body is producible from a plate material or sheet material. It is also advantageous for the regulating body, in particular when it is configured in a rotationally symmetrical manner, to be operable in any orientation. Thus, mounting is simplified since it is possible to dispense with controlling a correct orientation of installation.

It was possible to achieve particularly good regulating behaviour with a regulating body made of an elastic material, for example of rubber. The disk shape has the advantage here that the regulating body can be readily punched or cut.

In general, it can be stated that the regulating body bears on the at least one support element at least during operation, i.e. when subjected to pressure by a flow of water. The at least one support element thus forms a bearing point for the regulating body. In a waterless rest state, the regulating body may also be arranged such that it floats over the at least one support element or, more generally, is spaced apart therefrom.

In one configuration of the invention, provision may be made for the clear width of the control gap to be variable as a result of the at least one support element being moved. Thus, a flow rate to which the flow rate regulator limits within its working range is easily settable. A larger clear width causes a greater flow rate, while a smaller clear width yields a lower flow rate.

In one configuration of the invention, provision may be made for the at least one support element to be guided in the main body. Thus, defined movability is achievable, this allowing easy settability of the regulating behaviour—in particular including during operation with water flowing through.

Preferably, the at least one support element is arranged so as to be movable transversely to an inflow side, facing the control gap, of the main body. Thus, the at least one support element can be extracted from the main body and moved into the latter easily in order to increase or reduce the size of the control gap, respectively.

In one configuration of the invention, provision may be made for the at least one support element to be formed in a peg-like manner. Thus, as little installation space for the at least one support element as possible is able to be formed in the control gap and as much space for the flow of water as possible is able to be kept free in the control gap. Furthermore, a form of the at least one support element that is easily manufacturable is described. A peg shape may be characterizable for example by a constant cross section along a longitudinal extent. The cross-sectional shape may be configured for example in a circular, oval, polygonal or star-shaped manner or as some other free form. A peg shape having a rounded or round cross section has the advantage that as little disruption of flow as possible is achievable in the control gap. A peg shape with a non-round cross section can allow for example an additional, in particular torsion proof, guidance of the support element.

In one configuration of the invention, provision may be made for the at least one support element to have a smaller diameter and a larger diameter. It is thus possible for example for different stability regions to be formed, in particular in order to save material in less stressed regions. Between the different diameters, it is possible for a transition, for example a shoulder or step or stepless transition, to be formed. In the transition, it is also possible for at least one portion with a constant diameter to be formed, in order to form a plurality of stability regions.

In this case, provision may be made for a guide hole, in which the at least one support element is arranged in a movable manner, to be closed by the larger diameter in a first position of the support element and to be at least partially freed up by the smaller diameter in a second position of the support element. It is advantageous here for the movability or adjustability between the at least one support element and the main body to be usable for an auxiliary function, namely opening and closing of the guide hole, which is configured for example as a bypass. Support elements are also usable which have more than two different diameters. In this case, the guide hole can be formed with a constant inside diameter or in a correspondingly stepped manner or with a corresponding transition, for example in a conical manner. In the transition of the support element and/or of the guide hole, it is also possible for at least one portion with a constant diameter to be formed, for example in order to realize additional switching functions.

In one configuration of the invention, provision may be made for the at least one support element to be arranged at least partially in the control gap. Thus, a minimum clear width of the control gap is easily definable and settable.

In one configuration of the invention, provision may be made for at least one immovable spacer, which projects into the control gap, to be arranged on the main body. It is advantageous here for a minimum clear width of the control gap, beneath which it is not possible to drop in any setting of the at least one support element, to be definable. A minimum flow rate is thus definable.

In this case, provision may be made for an extent to which the at least one spacer projects into the control gap to be less than a smallest extent to which the at least one support element projects into the control gap. It has been found that, particularly where there is a large spacing between adjacent support elements, comparatively small fixed spacers contribute towards noise reduction during operation, preferably without any substantial change in the regulating behaviour. The at least one spacer is thus arranged preferably between those two immediately adjacent support elements of a series, for example the already mentioned series, of support elements which enclose the largest or at least a comparatively large gap between one another in the series.

In one configuration of the invention, no such spacers are provided. If the movability of the at least one support element is configured such that the at least one support element can be removed completely from the control gap, it is possible for a closure valve to be formed in that the regulating body is configured and/or arranged such that a drain opening—for example the drain opening described in more detail elsewhere—in the main body is closed or closable with the regulating body for example in a position in which the control gap has been reduced to zero.

In one configuration of the invention, provision may be made for the regulating body to be fastened to a carrier element. Thus, the regulating body is able to be secured against falling out. The carrier element also forms a further bearing point in addition to that of the at least one support element. The position and/or design of the regulating body is thus definable in an even better manner with regard to the main body. The control gap is thus able to be formed in a defined manner. Preferably, the regulating body is fastened in a sealing manner. Thus, a free end and a fixed end of the regulating body are formed. This is favourable for controlled behaviour of the regulating body for limiting flow rate. For example, the free end can be formed by an external contour—with regard to a radial direction proceeding from the carrier element—of the regulating body.

For example, the carrier element can be formed in a rod-like manner. Thus, a carrier element with a small space requirement is provided. It is favourable for the regulating body to be fastened centrally to the carrier element, for example in a central opening of the regulating body. This allows all-side use of the regulating body for regulating, in particular limiting, the flow rate.

In one configuration of the invention, provision may be made for the support element to carry the regulating body. Thus, a position of the regulating body as a whole is variable relative to a main body. The support element can thus additionally take on the functions of the above-described carrier element in this case. It is thus possible to dispense with further support elements, but—for example in order to realize different adjustment possibilities and/or adjustment speeds—these may be present in advantageous configurations.

In one configuration of the invention, provision may be made for the carrier element to be arranged in a movable manner relative to the main body. In this case, it is advantageous for a fastening or bearing point of the regulating body, which is provided by the carrier element, to be adjustable relative to the main body. Thus, an additional degree of freedom is formed, with which the regulating behaviour of the flow rate regulator is able to be influenced. It is already sufficient, for a large number of purposes, for the carrier element to be movable synchronously with the at least one support element relative to the main body.

Alternatively or additionally, provision may be made for the carrier element to be arranged in a movable manner relative to the at least one support element. For example, this is already achievable when the carrier element is arranged in an immovable manner on the main body. However, it is particularly favourable for the carrier element, the main body and the at least one support element to be arranged in a movable manner in each case independently of one another and in pairs with respect to one another. This opens up a large number of setting possibilities in order to influence the regulating behaviour and in particular a desired flow rate.

In one configuration of the invention, provision may be made for a coupling device to be set up to move the carrier element in the opposite direction to the at least one support element. Thus, the support element is for example lowerable in its middle, while it is raised at its external contour, and vice versa.

In one configuration of the invention, provision may be made for a coupling device to be set up to move the carrier element in the same direction as the at least one support element. Thus, a set flow rate is increasable—for example by removing the regulating body jointly from all bearing points on the main body—or reducible—for example by moving the regulating body jointly towards all bearing points on the main body.

In one configuration of the invention, provision may be made for a coupling device, for example the abovementioned coupling device, to effect a first adjustment rate of the at least one support element and a second adjustment rate of the carrier element. Thus, different adjustment rates are realizable for the support element or the support elements, for the one part, and the carrier element, for the other part. For example, the first adjustment rate may be greater than the second adjustment rate, in particular at least twice the second adjustment rate, or provision may be made for the first adjustment rate to be less than the second adjustment rate, in particular at most half the second adjustment rate. Thus, the particular influence on the regulating curve of a position of the regulating body on the carrier element and on the at least one support element is differently settable.

In one configuration of the invention, provision may be made for the at least one support element to be movable relative to the main body by way of a drive. Thus, easy setting during operation is able to be carried out.

In one configuration of the invention, provision may be made for the carrier element to be movable relative to the main body by way of a, for example the abovementioned, drive. This opens up an additional setting possibility.

Preferably, the drive is drivable in each case mechanically, for example via a spindle drive or a transmission, electrically, for example via an electric motor, and/or thermally, for example by way of a temperature-sensitive material, the expansion and/or shape of which is highly temperature-dependent, such as thermowax. Each drive form has its own advantages here: for instance, a mechanically drivable drive is easily operable manually, an electrically drivable drive is easily controllable remotely or in a control loop, a thermally drivable drive is controlled autonomously, in particular operable in a manner inaccessible from outside, for example by an ambient or water temperature.

In a structurally simple variant, the at least one support element and the carrier element are movable by in each case one drive in the form of a spindle drive. In this case, the spindle drives can be arranged concentrically with one another and/or in a parallel connection with one another. The parallel connection allows joint actuation in one operation, the concentric arrangement saves space. If the spindle drives are configured with different gradients, for example with different gradient steepnesses, different adjustment rates can also be easily achieved upon joint (manual) actuation.

In one configuration of the invention, provision may be made for the at least one support element and/or the carrier element to be guided onto an outflow side by the main body. Thus, a relative movement of the at least one support element and/or of the carrier element, for the one part, and of the main body, for the other part, relative to one another is able to be effected easily from the outflow side.

In one configuration of the invention, provision may be made for the drive to be arranged on the outflow side. Thus, unimpeded inflow of the flow of water into the control gap is achievable.

In one configuration of the invention, provision may be made for the at least one support element to belong to a series of support elements. There are thus a plurality of support elements which each define (different or similar) bearing points of the regulating body in order to set or define the control gap. For example, the support elements may define heights above the main body that are different from one another. Preferably, the series of support elements is arranged in a circumferential direction of the regulating body. Thus, different points of the regulating body can be supported easily on the circumference thereof. This allows good setting of the regulating position and thus of the regulating behaviour of the regulating body.

In particular, provision may be made here for the series to have at least two spacings that are different from one another between adjacent support elements. Thus, different regulating behaviour in different pressure ranges is achievable. It has been found that adjacent support elements at a large spacing from one another determine particularly the regulating behaviour at low pressures or pressure differences via the flow rate regulator, while adjacent support elements which are located close together and are thus at a small spacing from one another primarily define the regulating behaviour at high pressures or pressure differences via the flow rate regulator.

In one configuration of the invention, provision may be made for the support elements of the series to be arranged in a non-uniform manner in the circumferential direction. Thus, the entire circumference is able to be exploited in order to set regulating behaviour in different pressure ranges and thus over a large overall working range of the flow rate regulator. The spacings between adjacent support elements in this case correspond in each case to a partial range of the working range (large spacings to a low partial range, small spacings to a high partial range), in which regulating behaviour is set by a part of the regulating body that is effective between the support elements.

In one configuration of the invention, provision may be made for the support elements of the series to be coupled together so as to move synchronously relative to the base plate. It is advantageous here for a target flow rate to be easily variable, in particular reducible, in that the clear width of the control gap is reduced in size, and/or increasable, in that the clear width is increased in size.

Alternatively or additionally, in particular when the support elements are couplable to and uncouplable from one another, provision may be made for the support elements of the series to be arranged so as to be movable individually. Thus, it is possible for example for support elements to be lowered completely, with the result that the abovementioned spacings are variable easily at least in steps. In this way, regulating behaviour is easily variable in different pressure ranges.

In one configuration of the invention, provision may be made for a flow of water in the main body to be guided in a bend. Thus, an outlet is arrangeable at an angle to an inlet of the flow of water. In particular, provision may be made here for a drive, for example the abovementioned drive, to be arranged in an extension of an entering arm of the bend away from the flow of water. Thus, the drive is able to be configured so as to be actuable or accessible from the outside and/or to be usable in a manner protected from water.

The abovementioned drive may also, depending on the available space, be arranged at any desired position, wherein a preferably mechanical coupling can transmit an actuation or adjustment of the at least one support element and/or of the carrier element.

In one configuration of the invention, provision may be made for a drain opening to be formed in the main body. Thus, the flow of water can drain away easily. Preferably, the drain opening is arranged in the control gap between the carrier element and the at least one support element in a direction of flow. Thus, the flow of water can flow easily through the control gap and out of the latter.

In one configuration of the invention, provision may be made for the main body to be arranged in a pipe with an inside diameter adapted to the main body. Thus, the flow rate regulator according to the invention is able to be integrated easily into a liquid-conducting system. Preferably, the main body is arranged fixedly in the pipe, for example secured thereto. Thus, a support for the regulating body is able to be provided, which is effective at least during operation.

A preferred application of the invention may in this case provide for the use of a flow rate regulator according to the invention, in particular as described above and/or according to one of the claims directed at a flow rate regulator, for setting a flow rate during operation. Thus, easy adaptation to a use requirement can take place during operation. Preferably, the abovementioned drive is, in this case, accessible or actuable for the relative movement between the at least one support element and the main body from outside, i.e. for example from outside a water-conducting or liquid-conducting system, in particular by way of the above-described measures.

Preferably, the use provides for a mixing temperature, in particular a mixing ratio, of a mixture of cold and hot water to be set, i.e. in particular to be changed, during operation. As a result of the settable flow rate, it is in this case easily achievable for a mixing temperature to be set independently of pressure.

BRIEF DESCRIPTION OF THE DRAWINGS

The invention will now be described in more detail on the basis of exemplary embodiments, but is not limited to these exemplary embodiments. Further exemplary embodiments result from combining the features of individual dependent claims or a plurality of dependent claims with one another and/or with individual features or a plurality of features of the exemplary embodiments.

DETAILED DESCRIPTION

Figure 1:
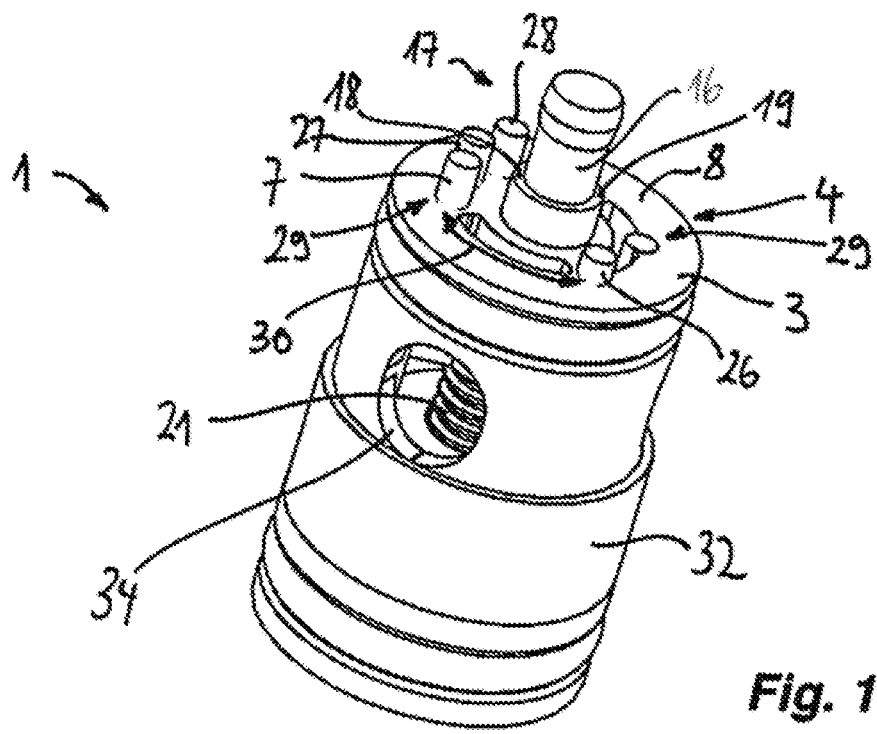
FIG. 1 shows a flow rate regulator according to the invention with the regulating body removed, in a three-dimensional oblique view.

First of all, FIGS. 1 to 4 are described together.

A flow rate regulator provided overall with the reference numeral 1 has a regulating body 2, which is formed in a disc-like and deformable manner.

The flow rate regulator 1 also has a main body 3 which encloses a control gap 4 with the regulating body 2. To this end, the regulating body 2 is arranged on the inflow side with respect to the main body 3.

Formed in the main body 3 is at least one drain opening 5 which is located downstream of the control gap 4. Water flowing in thus first of all flows around the regulating body 2, passes into the control gap 4 and drains out via the drain opening 5.

The control gap 4 has a clear width 6. This clear width 6 is definable via at least one support element 7 during operation, i.e. already when subjected to little pressure by the water.

In this case, the support element 7 is adjustable relative to the main body 3, such that the clear width 6 of the control gap 4 is variable by adjustment of the support element 7.

The main body 3 is formed in a substantially planar manner on its inflow side 8, which delimits the control gap 4. Thus, the flow of water can flow in an unimpeded manner via the inflow side 8 of the main body 3.

The regulating body 2 has a circumferential external contour 9 which describes the shape of a circular disc.

Figure 2:
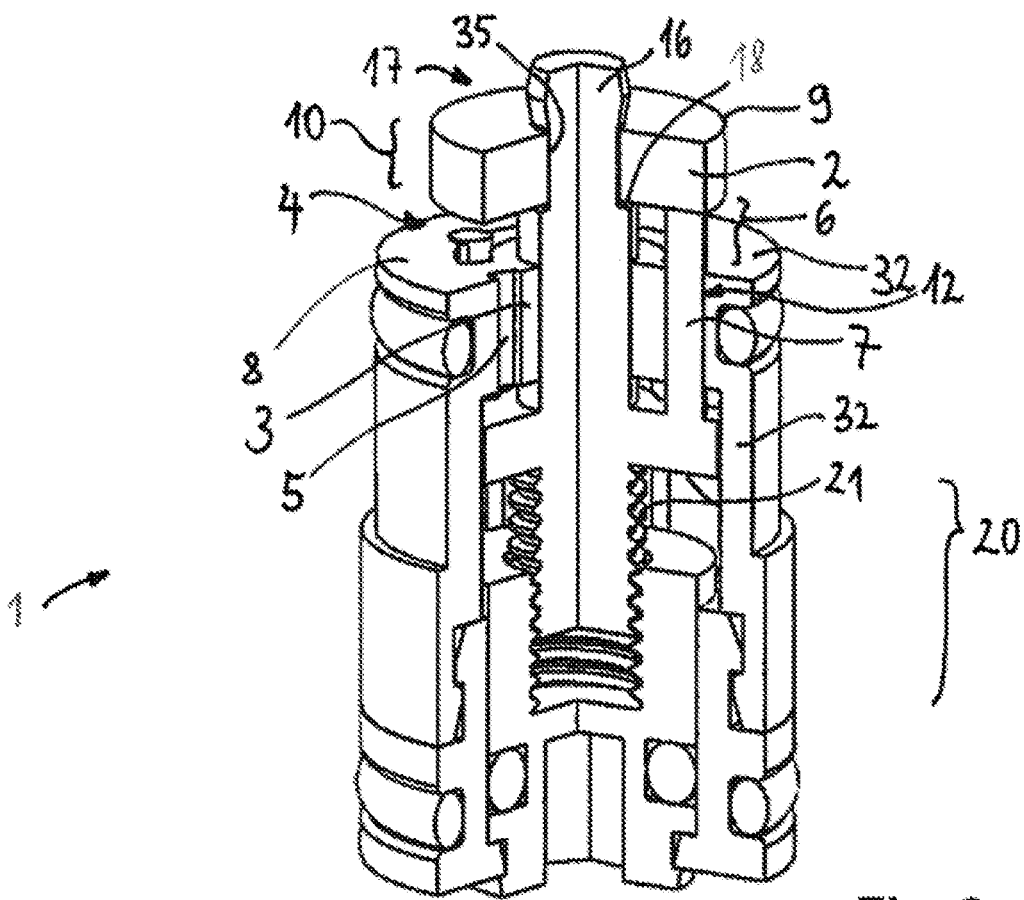
FIG. 2 shows the flow rate regulator according to FIG. 1 with the regulating body positioned, in a partially cut-away illustration.

It is also apparent from FIG. 2 that the regulating body 2 is manufactured with a uniform thickness 10. The regulating body 2 is made of rubber and is therefore elastically deformable.

In a manner which will be described in even more detail, the support element 7 is movable or adjustable relative to the main body 3.

As a result of this movement of the support element 7, an overhang 11 of the support element 7 beyond the main body 3 is variable. As a result, the regulating body 2 is lowerable or raisable via the main body 3 by way of a movement of the support element 7, with the result that the control gap 4 is reduced or increased in size.

Figure 3:
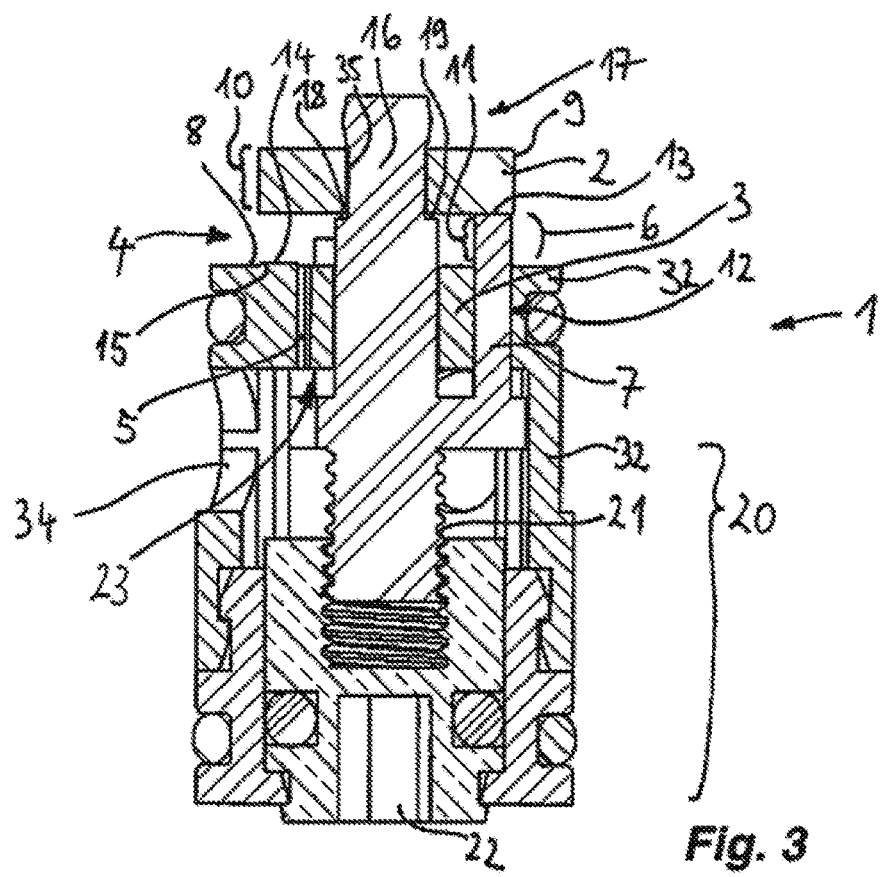
FIG. 3 shows a longitudinal section through the flow rate regulator according to the invention according to FIG. 2 in a first position of the support elements.
Figure 4:
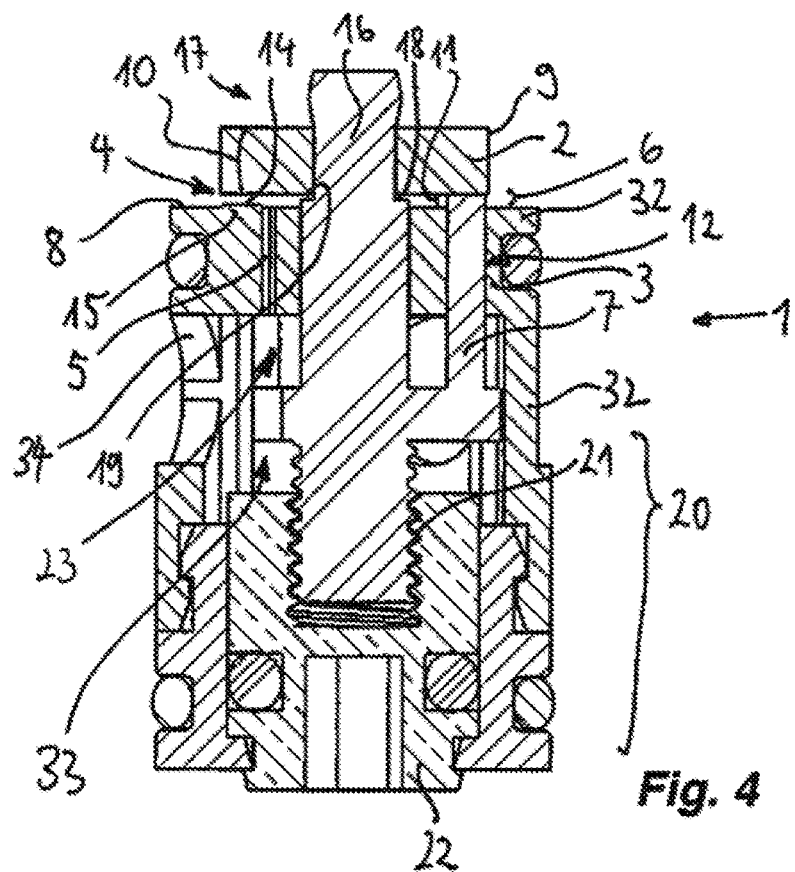
FIG. 4 shows the illustration in longitudinal section similar to FIG. 3, wherein the regulating body is arranged in a second position, allowing a narrower control gap.

This is apparent from a comparison of FIGS. 3 and 4: While FIG. 3 shows a large control gap 4, the arrangement according to FIG. 4 has a small control gap 4. In order to transfer the flow rate regulator 1 from the situation according to FIG. 3 to the situation according to FIG. 4, the at least one support element 7 was moved into the main body 3.

This results in different regulating behaviour of the flow rate regulator 1. In the arrangement according to FIG. 3, that is to say in an arrangement with a control gap 4 with a comparatively large clear width 6, a comparatively large flow rate (per unit time) flows, while in an arrangement according to FIG. 4, i.e. with a control gap 4 with a comparatively small clear width 6, a small flow rate flows.

To be more precise, a pressure difference via the flow rate regulator 1 has the effect, according to the general mode of action, that the regulating body 2 is deformed to a greater or lesser extent, such that, at large pressure differences, a control gap 4 forms with a clear width 6 which is much more constricted, compared with the rest positions shown in FIG. 3 and FIG. 4, than is the case at smaller pressure differences.

In this way, it is possible for the set flow rates to be constant over a wide pressure range.

Figure 14:
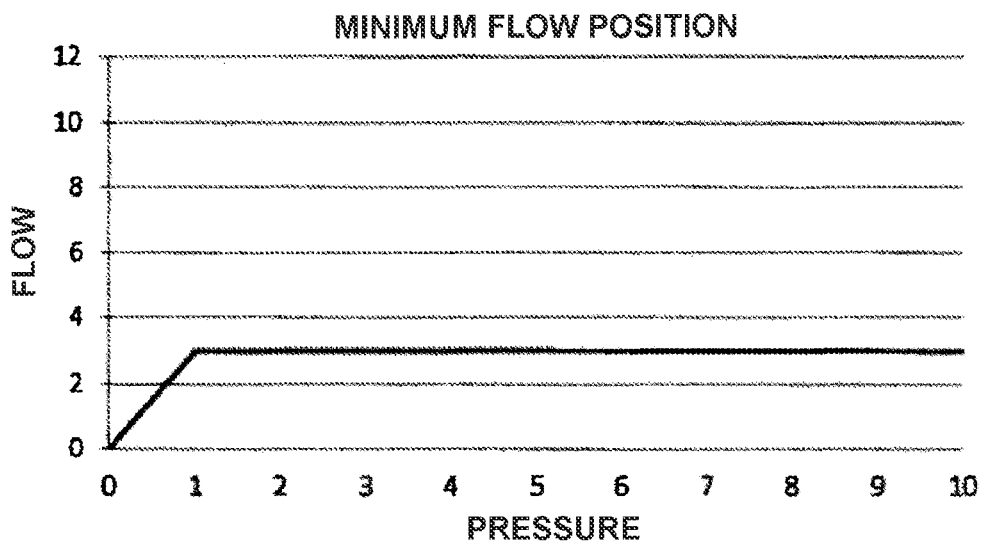
FIG. 14 shows a first regulating curve with a smaller target flow rate.
Figure 15:
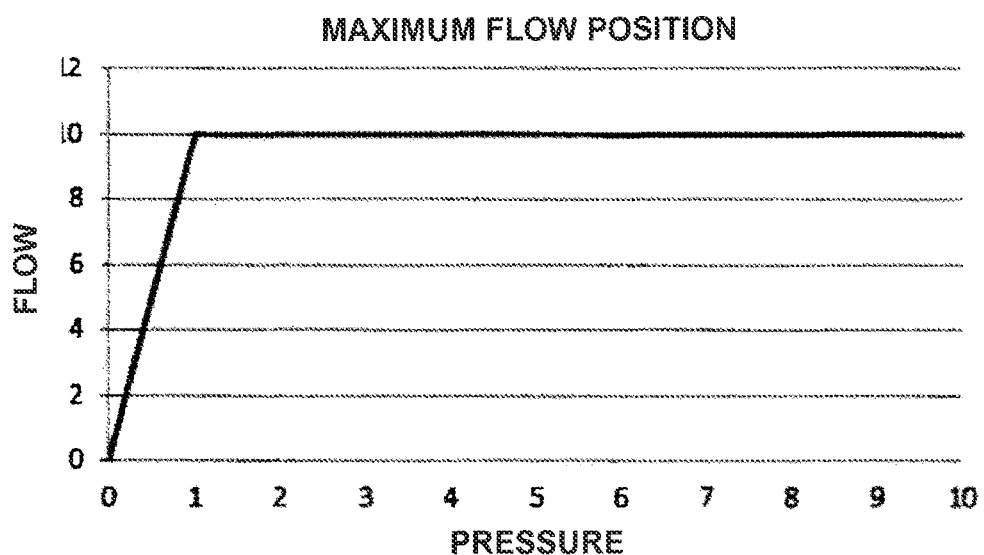
FIG. 15 shows a second regulating curve with a larger target flow rate.

As a result of the adjustability of the at least one support element 7 with respect to the main body 2, it is now possible, given the situation according to FIG. 3, for the regulating curve according to FIG. 15 to be achieved, while the position according to FIG. 4 results in a regulating curve according to FIG. 14. Clearly discernible in each case is the working range of the flow rate regulator, in which the regulating curve extends (approximately) horizontally and in which in each case different flow rates are achieved.

The support element 7 is plugged through a guide hole 12 in the main body 3 and is guided by the guide hole 12. The orientation of the guide hole 12 results in the support element being movable transversely to the main body 3 and in particular to the inflow side 8. Thus, the support element 7 can be moved easily into and out of the control gap 4, which extends approximately parallel to the inflow side 8.

In order to set the clear width 6, the support element 7 is arranged partially in the control gap 4 and thus forms a bearing point 13 for the regulating body 2.

The support element is formed in a peg-like manner in its portion which is located in the control gap 4, and has a cylindrical cross section.

Additionally formed on the main body 3, on the inflow side, is at least one spacer 15, which prevents the regulating body 2 from bearing fully against the main body 3. The spacer 15 is formed with a very small height compared to a typical or minimum height of the support element 7, and thus forms a low bearing point 14 over the main body 3.

Also formed on the main body 3 is a carrier element 16, which likewise projects from the inflow side 8. The regulating body 2 is fastened here to a free end 17 of the carrier element 16 and is placed down in a sealing manner on a circumferential shoulder 18. This shoulder 18 forms a further bearing point 19 for the regulating body 2.

The carrier element 16 passes centrally through the regulating body 2, such that the regulating body 2 is arranged centrally on the carrier element 16. To this end, a central opening 35, which receives the carrier element 16, is formed in the regulating body 2.

The at least one support element 7 is adjustable with regard to the main body 3 by means of a drive 20. To this end, the drive 20 has an adjusting thread 21 which is actuable via an actuating element 22 that is accessible from the outside.

The support element 7 is in this case guided onto the outflow side 23 by the guide hole 12 in the main body 3. The abovementioned drive 20 is also formed on the outflow side 23. As a result, the carrier element 16 is held in the main body 3 in a rotationally fixed manner with the support element 7.

Thus, a rotation at the actuating element 21 forces the support element 7 forward relative to the main body 3. This has the effect that the clear width 6 of the control gap 4 is increased or reduced in size, depending on the direction of rotation at the actuating element.

Figure 5:
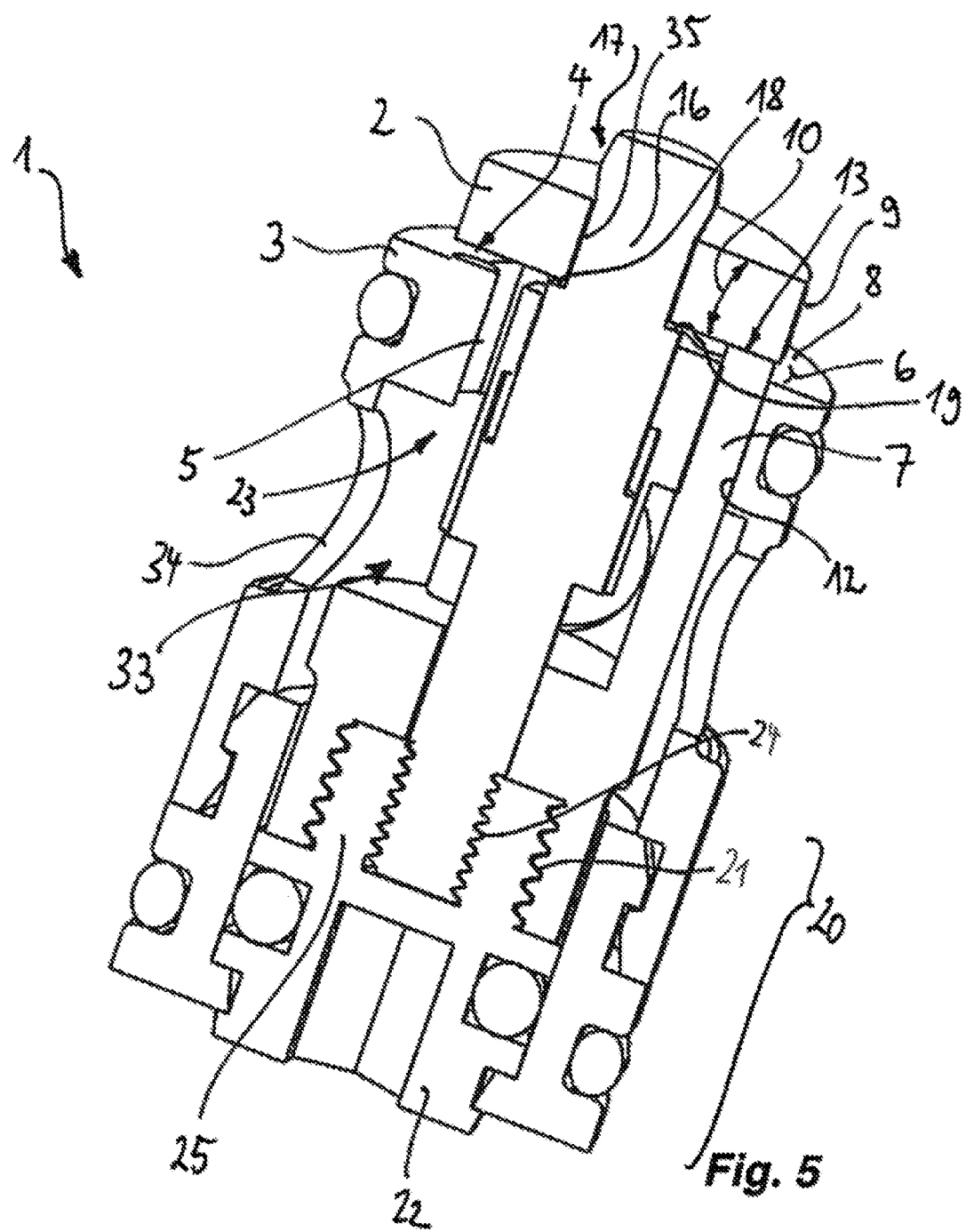
FIG. 5 shows a further flow rate regulator according to the invention, wherein the at least one support element and the carrier element are adjustable at different adjustment rates.

FIG. 5 shows a further exemplary embodiment according to the invention. Components and functional units that are structurally and/or functionally similar or identical to the preceding exemplary embodiment are denoted by the same reference signs and not described separately. The information given with respect to FIGS. 1 to 4 therefore applies, mutatis mutandis, to FIG. 5.

The exemplary embodiment according to FIG. 5 differs from the preceding exemplary embodiments by way of the configuration of the carrier element 16.

The carrier element 16 is in this case movable relative to the main body 3 in a manner which will be described in more detail. As a result of adjustment of the carrier element 16, the regulating body 2 is thus removable from or movable towards the main body 3. This has the effect that the carrier element 16 is also adjustable with regard to the at least one support element 7.

For adjustability, a further adjusting thread 24 is formed coaxially with the above-described adjusting thread 21, the carrier element 16 being drivable with said further adjusting thread 24.

The two adjusting threads 21, 24 are connected by the same actuating element 22, with the result that a coupling device 25 is established between the movements of the support element 7 and of the carrier element 16. Depending on the gradient and direction of rotation of the adjusting threads 21, 24, an adjusting movement in the same direction, optionally with different adjustment rates depending on the particular gradient of the adjusting threads 21, 24, or an adjusting movement in opposite directions results, in each case with a joint drive via the actuating element 22.

In the exemplary embodiment depicted, the adjusting thread 24 is finer than the adjusting thread 21, and so a first adjustment rate of the at least one support element 7, which results upon rotation of the actuating element 22, is greater than a second adjustment rate of the carrier element 16, which results—in a manner transmitted by the coupling device 25—upon the same rotation of the actuating element 22. In the present case, the first adjustment rate is even twice the second adjustment rate.

Figure 6:
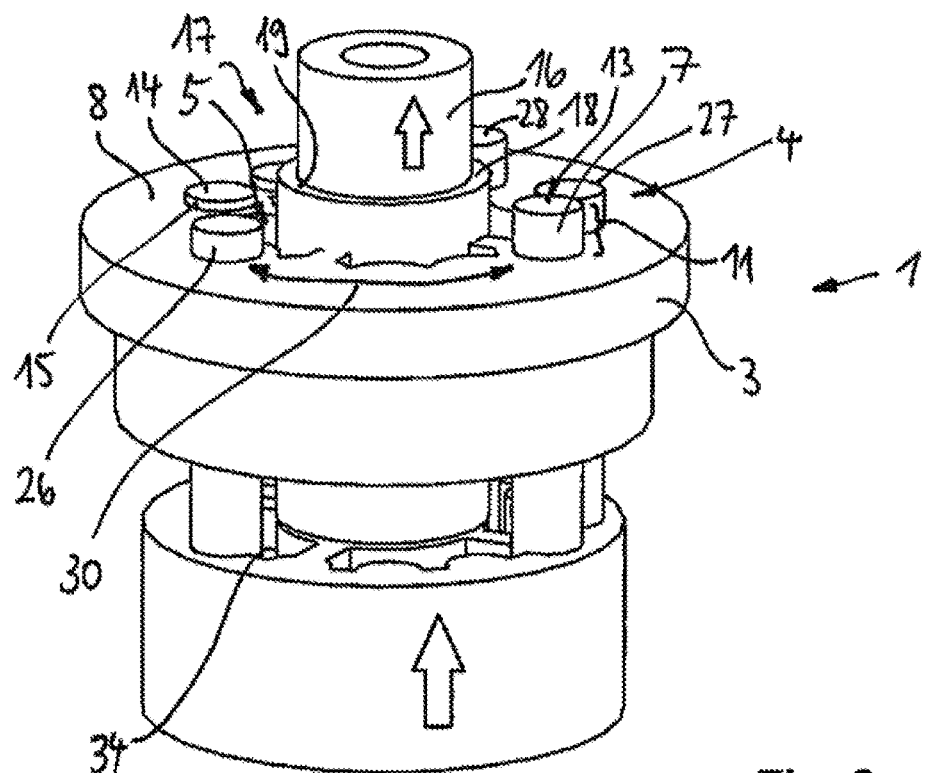
FIG. 6 shows the joint adjustment of the support elements and of the carrier element in a further flow rate regulator according to the invention with the regulating body removed.
Figure 7:
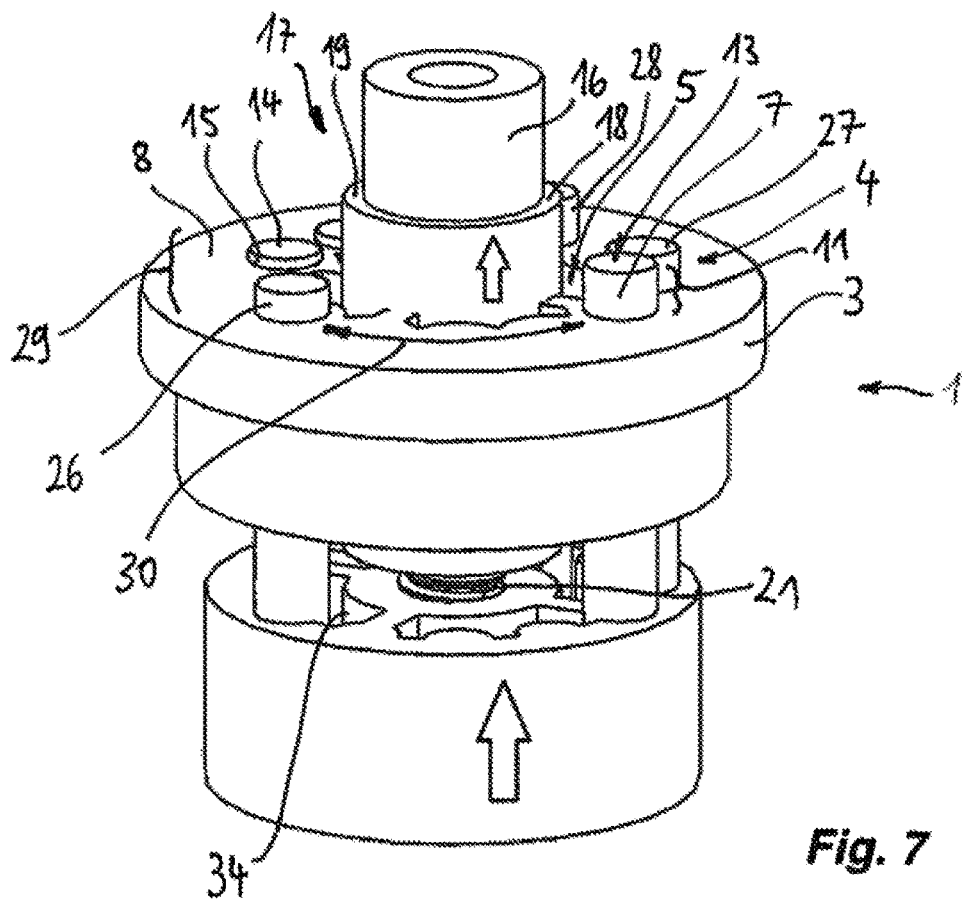
FIG. 7 shows the adjustment of only the carrier element in the flow rate regulator according to FIG. 6.
Figure 8:
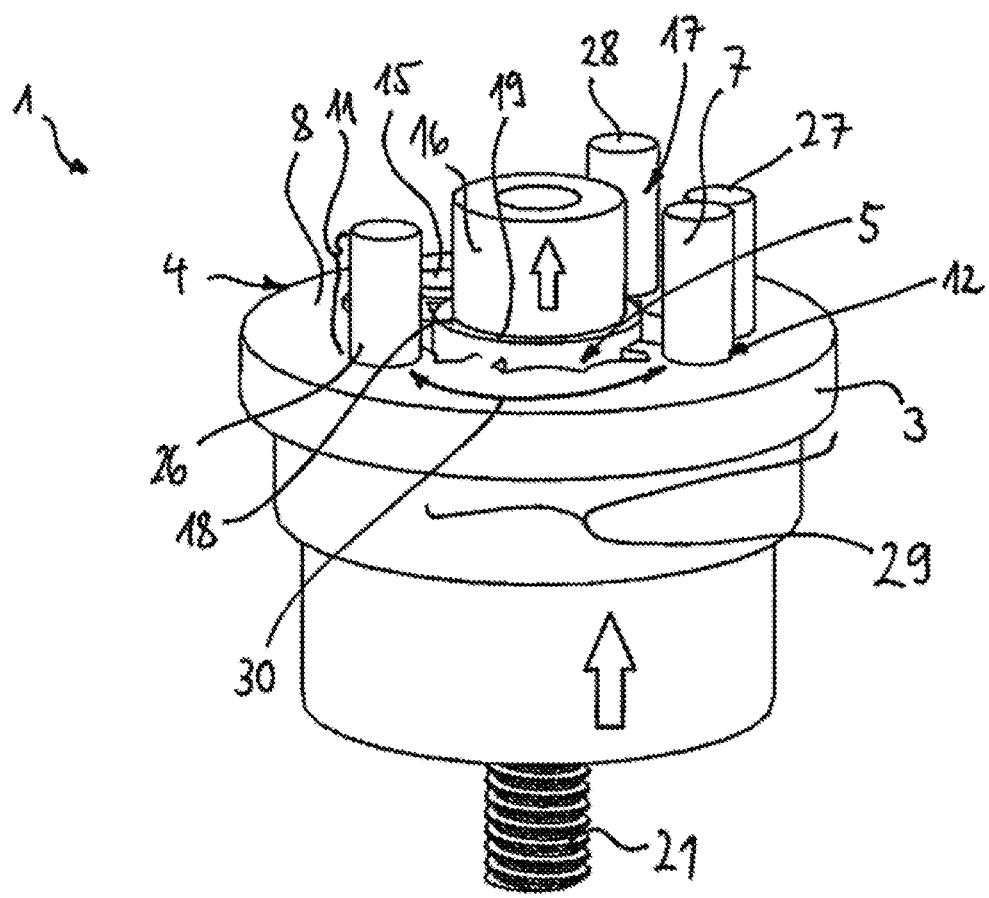
FIG. 8 shows the adjustment of only the support elements in the flow rate regulator according to FIG. 6.

FIGS. 6 to 8 show a further flow rate regulator 1 according to the invention. Again, similar or identical components and functional units are denoted by the same reference signs and not described separately again. The previous information given for FIGS. 1 to 5 therefore applies, mutatis mutandis, to FIGS. 6 to 8.

FIG. 6 shows the case of a common adjustment rate of the support element 7 and of the carrier element 16. This results, for example, when the adjusting threads 21, 24 on the coupling device 25 have a corresponding gradient and a corresponding direction of rotation.

FIG. 7 shows the case in which only the carrier element 16 is coupled to the actuating element 22. The support element 7 can in this case be drivable separately or be coupled via a very fine gradient of the actuating thread 21. In the latter case, the support element 7 moves only insignificantly.

FIG. 7 can furthermore result when the directions of rotation of the adjusting threads 21, 24 are in opposite directions. Then, the support element 7 is drawn into the main body 3 when the carrier element 16 is moved out.

FIG. 8 shows the reverse case. In this case, only the support element 7 is moved, while the carrier element 16 remains immovable, or the support element 7 is moved in the opposite direction to the carrier element 16, i.e. drawn in, when the carrier element 16 is moved out, and vice versa.

In FIGS. 6 to 8, it is also apparent that a plurality of further support elements 26, 27, 28 are formed which form a series 29 of support elements 7, 26, 27, 28 around the circumference of the regulating body 2. The support elements 7, 26, 27, 28 are distributed in a non-uniform manner around the circumference of the regulating body 2, such that the pairs of adjacent support elements 7, 26, 27, 28 each enclose different spacings 30 between one another. For example, the spacing 30 between the support elements 7 and 26 is large, and so the regulating body 2 is pliant here. This portion therefore determines the behaviour at low pressures. The spacing between the support elements 7 and 27 is, by contrast, small, and so the regulating body 2 is stiff here. Therefore, this spacing determines the regulating curve at high pressures. Overall, this distribution results in a regulating curve which reaches the plateau even at comparatively low pressures.

The support elements 7, 26, 27, 28 can, as shown in FIG. 5, be coupled together such that they can be adjusted in the same direction and at corresponding adjustment rates.

In further exemplary embodiments, the support elements 7, 26, 27, 28 are provided with an individual coupling device 25, but can also be movable individually and thus adjustable individually.

Figure 9:
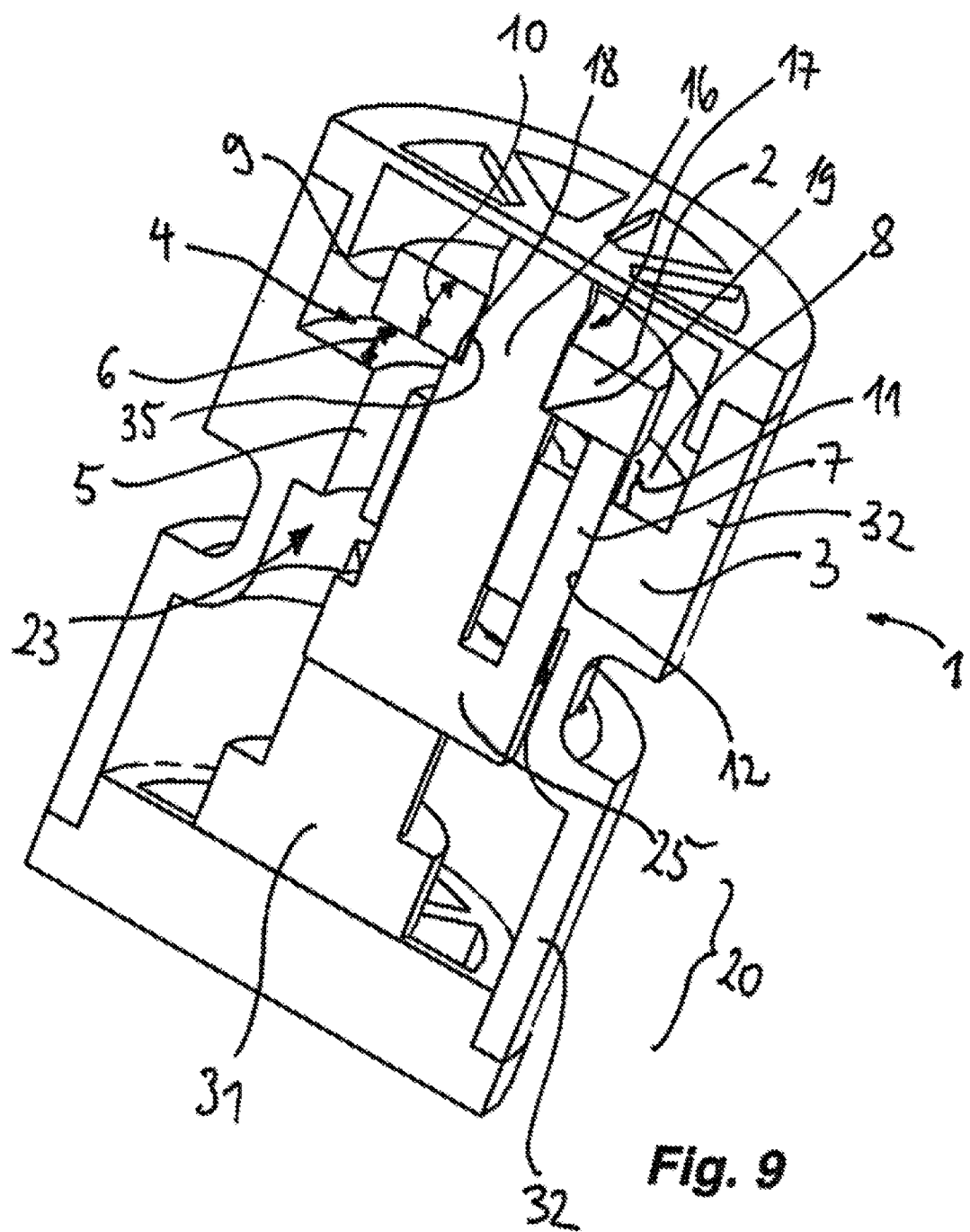
FIG. 9 shows a further flow rate regulator according to the invention, in which a thermodynamic drive is formed.

FIG. 9 shows a further exemplary embodiment according to the invention. Components and functional units that are structurally and/or functionally similar and/or identical to the preceding exemplary embodiment are denoted by the same reference signs and not described separately. The information given with respect to FIGS. 1 to 8 therefore applies, mutatis mutandis, to FIG. 9.

The exemplary embodiment according to FIG. 9 differs from the preceding exemplary embodiments by way of the configuration of the drive 20.

In the present exemplary embodiment, the drive 20 is configured as a thermally drivable drive 31 around which the water flowing past flows and the extent of which in the longitudinal direction is temperature-dependent. This can be achieved for example in that the thermally drivable drive 31 is filled with a temperature-sensitive wax which exhibits a characteristic expansion behaviour depending on the temperature.

In further exemplary embodiments, the drive 20 can also be configured as an electric motor or in some other way.

In any case, the drive 20 has the effect that the carrier element 16 is displaceable in the main body 2 jointly with the at least one support element 7 and in particular with all support elements 7, 26, 27, 28 that are present. Optionally, spring elements appropriate for a return movement are provided, these not being illustrated further.

It is apparent from the sectional illustrations that, in the exemplary embodiments, the carrier element 18 and the movable support elements 7, 26, 27, 28 are guided through the main body 3 and pass out on an outflow side 23. The abovementioned drive 20 is likewise arranged on this outflow side 23 of the main body 3.

In the exemplary embodiment according to FIG. 9, the coupling device 25 has the effect that the support elements 7, 26, 27, 28 (not illustrated) move synchronously with one another and with the carrier element 16.

The main body 3 is arranged in a pipe 32 which defines the external dimensions of the flow rate regulator 1, and is connected integrally to this pipe 32. In further exemplary embodiments, the main body 3 can be formed separately from the pipe 32. The pipe 32 can then be inserted into a further pipe such that the main body 3 is also arranged in this further pipe.

In the pipe 32, in the exemplary embodiment according to FIGS. 1 to 4 and according to FIG. 5, a bend 33 for the flow of water is formed downstream of the outflow side 23, such that the flow of water can emerge at a laterally arranged outlet 34.

In the exemplary embodiments according to FIGS. 6 to 8 and according to FIG. 9, by contrast, the flow of water passes, without a bend, rectilinearly through the flow rate regulator.

The flow rate regulator 1 can be used for example for it to be possible to set a flow rate of a flow of water variably. This can be used for example in order to achieve a desired mixing temperature by mixing a hot water flow and a cold water flow, wherein the flow rate of the hot water flow and/or of the cold water flow is settable with the flow rate regulator 1 according to the invention.

Figure 10:
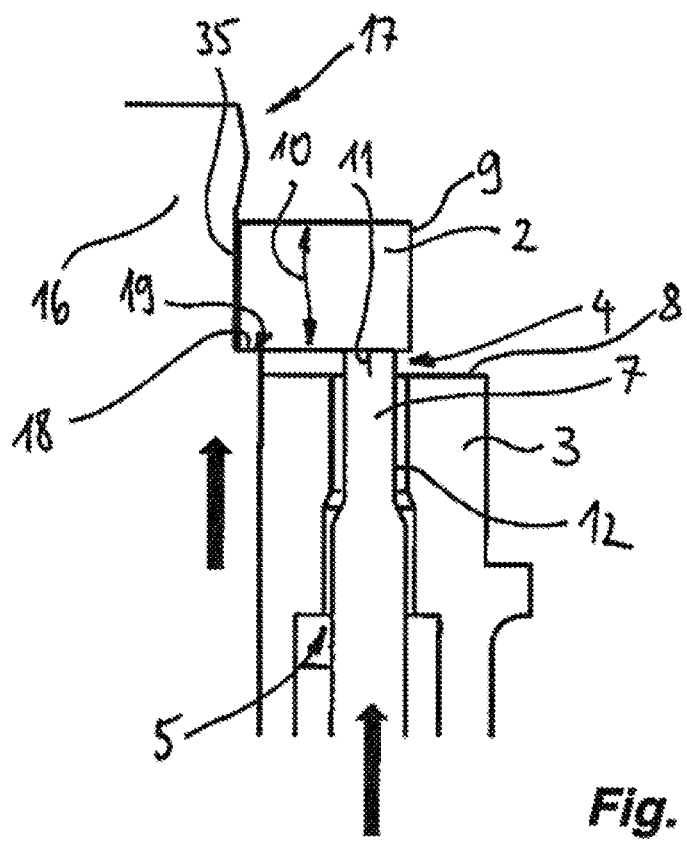
FIG. 10 shows a detail illustration of a longitudinal section with a support element, formed in a stepped manner, in an open position.
Figure 11:
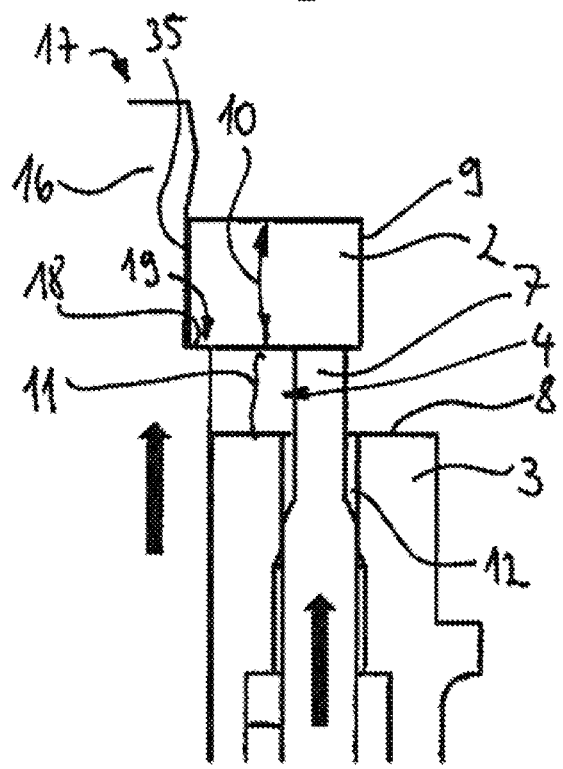
FIG. 11 shows the support element from FIG. 10 in a corresponding detail illustration of a longitudinal section, wherein the support element closes a guide hole.

FIGS. 10 and 11 show details of a further exemplary embodiment according to the invention. Components and functional units that are structurally and/or functionally similar or identical to the preceding exemplary embodiment are denoted by the same reference signs and not described separately. The information given with regard to FIGS. 1 to 9 therefore applies, mutatis mutandis, to FIGS. 10 and 11.

It is apparent from FIG. 10 that the peg-like support element 7 is able to be configured with two diameters, wherein the stepped guide hole 12 likewise has two diameters in a corresponding manner. In the position according to FIG. 10, the guide hole 12 is thus open and can serve as a drain opening 5.

In the situation according to FIG. 11, i.e. with the support element 7 extracted from the main body 3, by contrast, the guide hole 12 is closed. To this end, the larger diameter of the support element 7 is coordinated with the smaller diameter of the guide hole 12.

Figure 12:
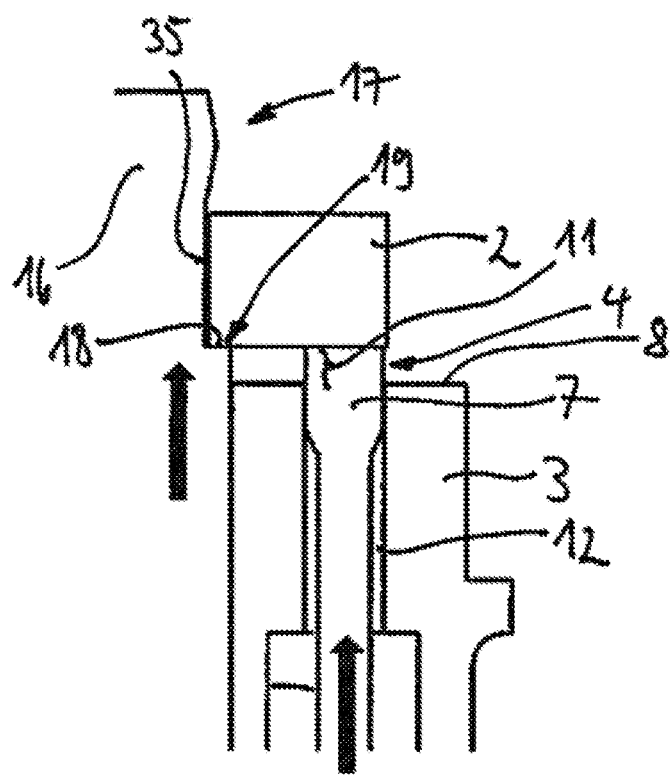
FIG. 12 shows an alternative variant to FIG. 10.
Figure 13:
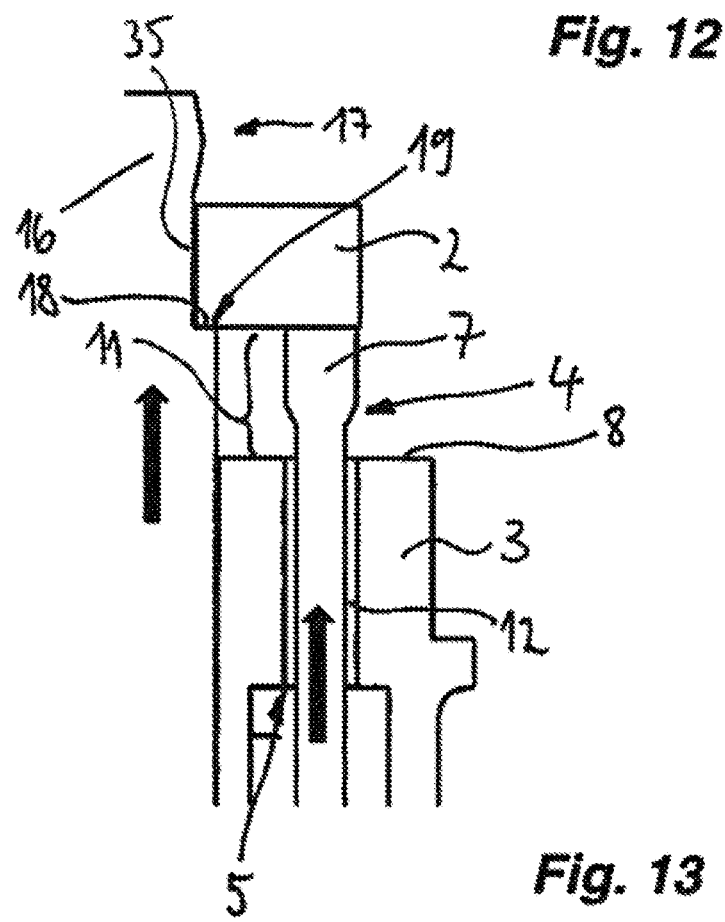
FIG. 13 shows an alternative variant to FIG. 11.

FIGS. 12 and 13 show an alternative to FIGS. 10 and 11. Components and functional units that are structurally and/or functionally similar or identical are again denoted by the same reference signs and not described separately again. The information given with regard to FIGS. 1 to 11 therefore applies, mutatis mutandis, to FIGS. 12 and 13.

The exemplary embodiment according to FIGS. 12 and 13 differs from the exemplary embodiment according to FIGS. 10 and 11 in that the guide hole 12 is formed with a uniform diameter. The at least one support element 7 is, by contrast, still formed with two diameters, wherein the larger diameter is coordinated with the diameter of the guide hole 12. Thus, in the situation according to FIG. 12, i.e. with the support element 7 moved in, the guide hole 12 can be closed, while in FIG. 13, i.e. with the support element 7 extracted, it is open and forms a drain opening 5.

If no further drain openings 5 are formed in the main body 3, the flow rate regulator 1 can be used as a simple shutoff valve.

If an additional drain opening 5—for example in the vicinity of the carrier element 16—is formed, the flow rate regulator 1 can serve, in the manner described, to regulate a constant flow rate in the working range. The guide holes 12 can in this case represent bypasses, in order to achieve drainage that is increased further.

Figure 16:
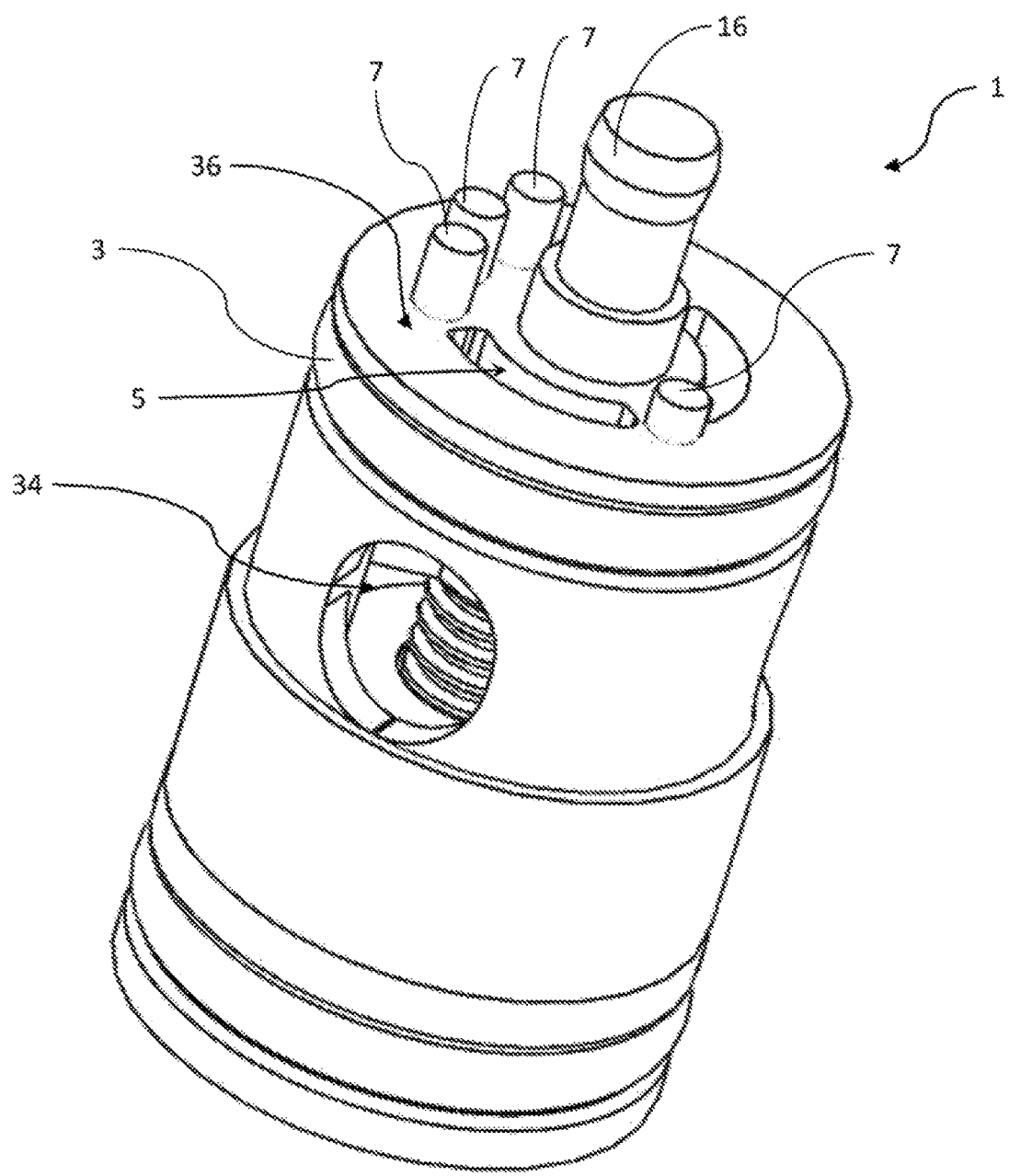
FIG. 16 shows a further flow rate regulator according to the invention with the regulating body removed.
Figure 17:
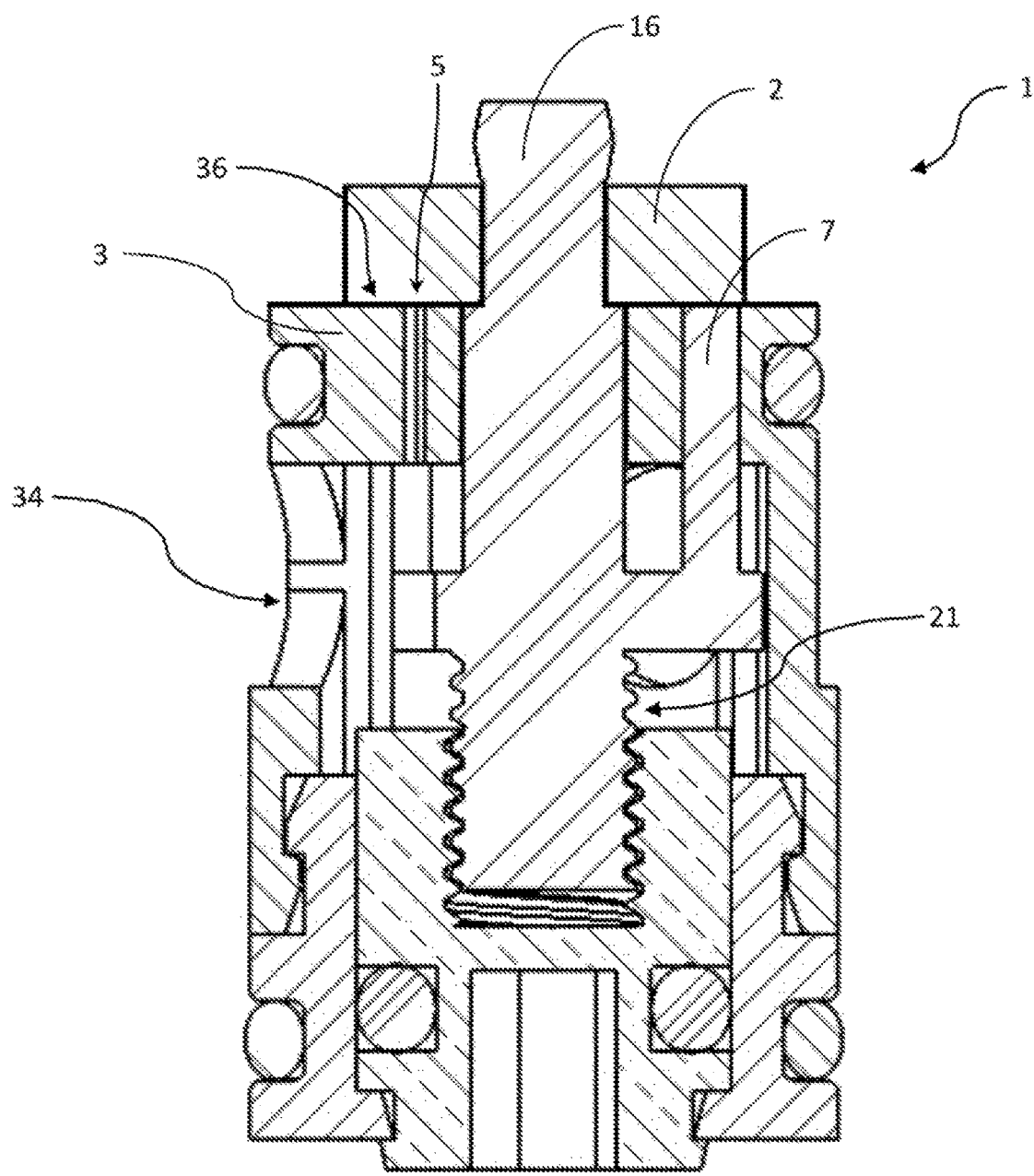
FIG. 17 shows the flow rate regulator from FIG. 16 in a longitudinal section.

FIGS. 16 and 17 show a further flow rate regulator 1 according to the invention. Again, components and functional units that are similar or identical are denoted by the same reference signs and not described separately again. The previous information given with regard to FIGS. 1 to 15 therefore applies, mutatis mutandis, to FIGS. 16 and 17.

The exemplary embodiment according to FIGS. 16 and 17 differs from the previous exemplary embodiments in that the support element 7 is movable into a position 7 shown in FIG. 17, in which the regulating body 2 completely closes the drain opening 5. This is achieved in the exemplary embodiment in that the above-described spacers 15 are dispensed with, and so the regulating body 2 bears flat against the main body 3, formed in a planar manner, in a bearing region 36. Thus, a stopping and/or closure function is realized, which allows continuous setting of the flow rate from a value other than zero to the value of zero.

In this case, provision can be made—as shown in the example—for the at least one support element 7 to be lowered completely into the main body 3.

It is also possible, in the above-described exemplary embodiments, for the spacers 15 to each be omitted in order to achieve a stopping and/or closure function.

In the case of the flow rate regulator 1, it is thus proposed a clear width 6 of a control gap 4, which is formed between a regulating body 2 and a main body 3, wherein the regulating body 2 is deformable in a pressure-dependent manner in order to set a constant flow rate through the control gap 4, an adjustability of the clear width 6 to be set up in that at least one support element 7, which sets the clear width 6 of the control gap 4, is configured in a movable manner relative to a main body 3.

LIST OF REFERENCE SIGNS

1 Flow rate regulator
2 Regulating body
3 Main body
4 Control gap
5 Drain opening
6 Clear width
7 Support element
8 Inflow side
9 External contour
10 Thickness
11 Overhang
12 Guide hole
13 Bearing point
14 Bearing point
15 Spacer
16 Carrier element
17 Free end
18 Shoulder
19 Bearing point
20 Drive
21 (First) adjusting thread
22 Actuating element
23 Outflow side
24 Second adjusting thread
25 Coupling device
26 Support element
27 Support element
28 Support element
29 Series
30 Spacing
31 Thermally drivable drive
32 Pipe
33 Bend
34 Outlet
35 Central opening
36 Bearing region

The invention claimed is:

1. A flow rate regulator (1), comprising:
   a main body (3);
   a disc-shaped, deformable regulating body (2) arranged on an inflow side with respect to the main body (3) such that a control gap (4) is formed between the regulating body (2) and the main body (3);
   at least one drain opening (5), arranged downstream of the control gap (4), formed in the main body (3);
   at least one support element (7);
   a clear width (6) of the control gap (4) is defined, at least during operation, by the at least one support element (7); and
   the at least one support element (7) is arranged in a movable manner relative to the main body (3).

2. The flow rate regulator (1) according to claim 1, wherein the at least one support element (7) is movable relative to the main body (3) into a position in which the regulating body (2) at least one of closes the drain opening (5) or bears flat against the main body (3).

3. The flow rate regulator (1) according to claim 1, wherein the main body (3) is formed in a substantially planar manner on an inflow side (8) delimiting the control gap (4).

4. The flow rate regulator (1) according to claim 1, wherein the regulating body (2) has at least one of an external contour (9) of a circular disc or a uniform thickness (10).

5. The flow rate regulator (1) according to claim 1, wherein at least one of: the clear width (6) of the control gap (4) is variable via a movement of the at least one support element (7), or the at least one support element (7) is guided in the main body (3) transversely to a side, facing the control gap (4), of the main body (3).

6. The flow rate regulator (1) according to claim 1, wherein the at least one support element (7) is formed peg-shaped.

7. The flow rate regulator (1) according to claim 1, wherein the at least one support element (7) has a smaller diameter and a larger diameter, and a guide hole (12), in which the at least one support element (7) is arranged in a movable manner, is closed by the larger diameter in a first position of the support element (7) and is at least partially freed up by the smaller diameter in a second position of the support element (7).

8. The flow rate regulator (1) according to claim 1, wherein the at least one support element (7) is arranged at least partially in the control gap (4).

9. The flow rate regulator (1) according to claim 1, further comprising at least one immovable spacer (15), which projects into the control gap (4), arranged on the main body (3), and an extent to which the at least one spacer (15) projects into the control gap (4) is less than a smallest extent to which the at least one support element (7) projects into the control gap (4).

10. The flow rate regulator (1) according to claim 1, further comprising a carrier element to which the regulating body (2) is fastened, and the carrier element (16) is arranged in a movable manner relative to at least one of the main body (3) or the at least one support element (7).

11. The flow rate regulator (1) according to claim 1, wherein the support element (7) carries the regulating body (2).

12. The flow rate regulator (1) according to claim 1, further comprising a coupling device (25) set up to move the carrier element (16) in an opposite direction to or in a same direction as the at least one support element (7).

13. The flow rate regulator (1) according to claim 12, wherein the coupling device (25) effects a first adjustment rate of the at least one support element (7) and a second adjustment rate of the carrier element (16).

14. The flow rate regulator (1) according to claim 10, wherein at least one of the at least one support element (7) or the carrier element (16) is movable relative to the main body (3) by way of a drive (31) that is at least one of mechanically, electrically, or thermally drivable.

15. The flow rate regulator (1) according to claim 14, wherein at least one of the at least one support element (7) or the carrier element (16) is guided onto an outflow side (8) by the main body (3), or the drive (20) is arranged on the outflow side.

16. The flow rate regulator (1) according to claim 1, wherein the at least one support element (7) comprises a series of support elements (7) that are arranged in a circumferential direction of the regulating body (2).

17. The flow rate regulator (1) according to claim 16, wherein the support elements (7, 26, 27, 28) of the series are arranged in a non-uniform manner in the circumferential direction.

18. The flow rate regulator (1) according to claim 16, wherein the support elements (7, 26, 27, 28) of the series are coupled or couplable together so as to move synchronously relative to the base plate.

19. The flow rate regulator (1) according to claim 1, wherein a flow of water in the main body (3) is guided in a bend (33), and a drive for the at least one support element (7) is arranged in an extension of an entering arm of the bend (33) away from the flow of water.

20. The flow rate regulator (1) according to claim 1, wherein the main body (3) is arranged in a pipe (32) with an inside diameter adapted to the main body (3).

21. A method of controlling a flow rate, comprising:
providing a flow rate regulator (1) according to claim 1; and
setting at least one of a flow rate, a mixing temperature, in a mixing ratio, or a mixture of cold and hot water, during operation, an externally actuable drive for the relative movement between the at least one support element (7) and the main body (3).

* * * * *